Figure 1:
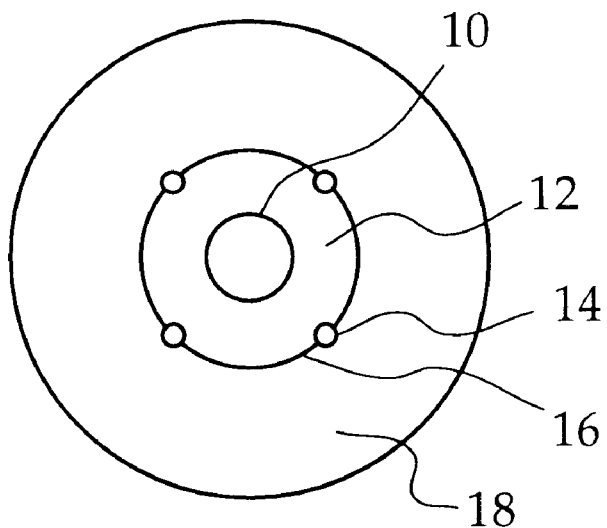

United States Patent [19]
Norman et al.

[11] Patent Number: 6,035,086
[45] Date of Patent: Mar. 7, 2000

[54] OPTICAL FIBER CABLE AND METHOD OF MANUFACTURE

[75] Inventors: Philip A. Norman, Bishops Stortsford; Keith Henderson, Southampton; Timothy J. Dixon, Harlow; Stuart R. Barnes, Salisbury; Peter Worthington, Southampton; David Curtis, Salisbury, all of United Kingdom

[73] Assignee: Alcatel, Paris, France

[21] Appl. No.: 09/011,086

[22] PCT Filed: Jul. 25, 1996

[86] PCT No.: PCT/GB96/01788

§ 371 Date: Jun. 12, 1998

§ 102(e) Date: Jun. 12, 1998

[87] PCT Pub. No.: WO97/04943

PCT Pub. Date: Feb. 13, 1997

[30]     Foreign Application Priority Data

Jul. 31, 1995 [GB] United Kingdom .................... 9515685

[51] Int. Cl.[7] ....................................................... G02B 6/44
[52] U.S. Cl. ............................ 385/103; 385/147; 385/104
[58] Field of Search ................................... 385/100–104, 385/147

[56]             References Cited

U.S. PATENT DOCUMENTS

| 4,765,711 | 8/1988  | Obst ........................................ 405/154 |
| 4,902,097 | 2/1990  | Worthington et al. ............... 350/96.23 |
| 5,291,573 | 3/1994  | Yoshida et al. ......................... 385/103 |
| 5,604,833 | 2/1997  | Kambe et al. .......................... 385/104 |

FOREIGN PATENT DOCUMENTS

| 0218952 | 4/1987  | European Pat. Off. . |
| 0250173 | 12/1987 | European Pat. Off. . |
| 0646819 | 4/1995  | European Pat. Off. . |
| 2136350 | 9/1984  | United Kingdom . |

*Primary Examiner*—Hung N. Ngo
*Attorney, Agent, or Firm*—Ware, Fressola, Van Der Sluys & Adolphson LLP

[57]          ABSTRACT

An optical fiber cable has a kingwire (10) provided with inner and outer extruded layers (12, 18) of a thermoplastic elastomer. A plurality of optical fibers (14) are disposed on the outer surface (16) of the inner layer (12) and are embedded in the outer layer (18). The cable is constructed by extruding a thermoplastic elastomer around a kingwire, setting the elastomer layer, laying a plurality of optical fibers along the set elastomer layer and extruding a further layer of thermoplastic elastomer over the fibers.

29 Claims, 3 Drawing Sheets

OPTICAL FIBER CABLE AND METHOD OF MANUFACTURE

This invention relates to an optical fibre cable and to its method of manufacture and more particularly to the reduction in polarisation mode dispersion in such cables.

Deformities of optical fibre cross section modify the internal birefrigence of the fibre and result in the normally single polarisation mode for the fibre becoming two orthogonal polarised modes. If the dispersion between these two modes, called polarisation mode dispersion, becomes large enough then bit errors can occur in digital systems.

One method of manufacturing optical fibre cables is described in EP-A-0250173 which method is to extrude a thermoplastic polymer coating over a kingwire to provide a surface for receiving the fibres. The surface of the layer is melted and the fibres are embedded into the surface prior to extrusion of a second layer of thermoplastic polymer to cover the fibres. We have experimented with such a method where we have used HYTREL 40D as the thermoplastic material (HYTREL is a Trade Mark of Dupont). We have found that such a construction results in a significant level of polarisation mode dispersion in the fibres and it has been discovered that stresses induced as a consequence of extrusion of the elastomer onto the fibre causes the deformation of the otherwise circular cross section of the fibre and contributes significantly to the polarisation mode dispersion.

The present invention seeks to provide an improved construction and method of manufacture of optical fibre cable in which polarisation mode dispersion is reduced.

According to the invention there is provided a method of manufacturing an optical fibre cable comprising the steps of, extruding a thermoplastic elastomer layer around a kingwire, setting the elastomer layer, laying a plurality of optical fibres along the set elastomer and extruding a further layer of thermoplastic elastomer over the fibres.

The method may be carried out in one processing line, wherein after extruding the thermoplastic elastomer around the kingwire the coated kingwire is cooled to a temperature below the melt temperatures of the elastomer and then the optical fibres are layed therealong. Alternatively, after extruding the thermoplastic elastomer around the kingwire, the coated kingwire is cooled to solidify the coating and is subsequently heated to soften the layer at a temperature below the melt point of the elastomer prior to laying the optical fibres therealong. The latter method may be carried out in two separate production processes wherein the coated kingwire is produced and stored and is subsequently employed in the process of laying the plurality of optical fibres including the step of preheating the elastomer coating to a temperature below its melt point to soften the layer prior to laying the optical fibres therealong.

The temperature of the first elastomer layer may be arranged to be up to 26° below the melt point when laying the optical fibres and is preferably within 6° C. of the melt point of the elastomer which melt point may be approximately 156° C.

Preferably, the thermoplastic elastomer employed has a Youngs Modulus value less than 100 MPa at 20° C.

The invention also includes an optical fibre cable, comprising a kingwire provided with inner and outer extruded layers of a thermoplastic elastomer and a plurality of optical fibres disposed on the outer surface of the inner layer and embedded in the outer layer.

The thermoplastic material may be HYTREL 35D. A suitable extrusion temperature for the further layer of thermoplastic elastomer is between 156° C. and 200° C.

The fibres may be twisted about their own axis, and/or twisted helically about the first layer prior to extrusion of the further layer. The or each twist may be a continuous twist or a to and fro twist through a predetermined angle. In one advantageous construction each twist is one turn between 1 and 10 meters of fibre length.

Figure 2:
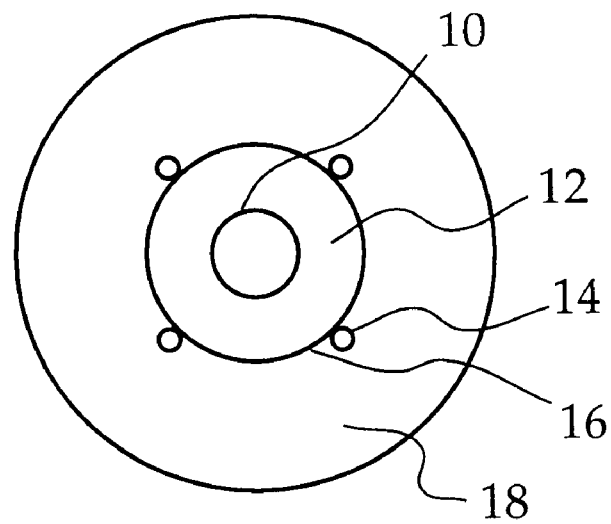
Figure 3:
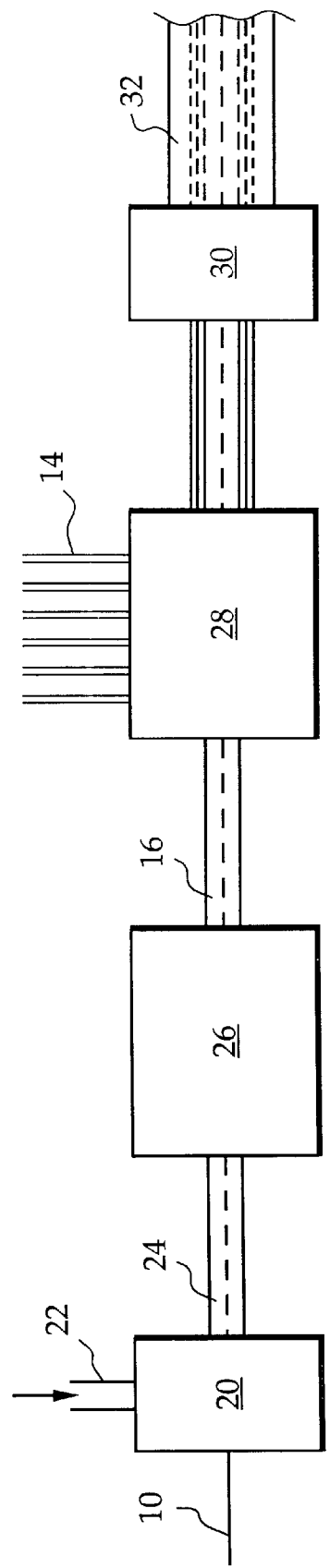
Figure 4:
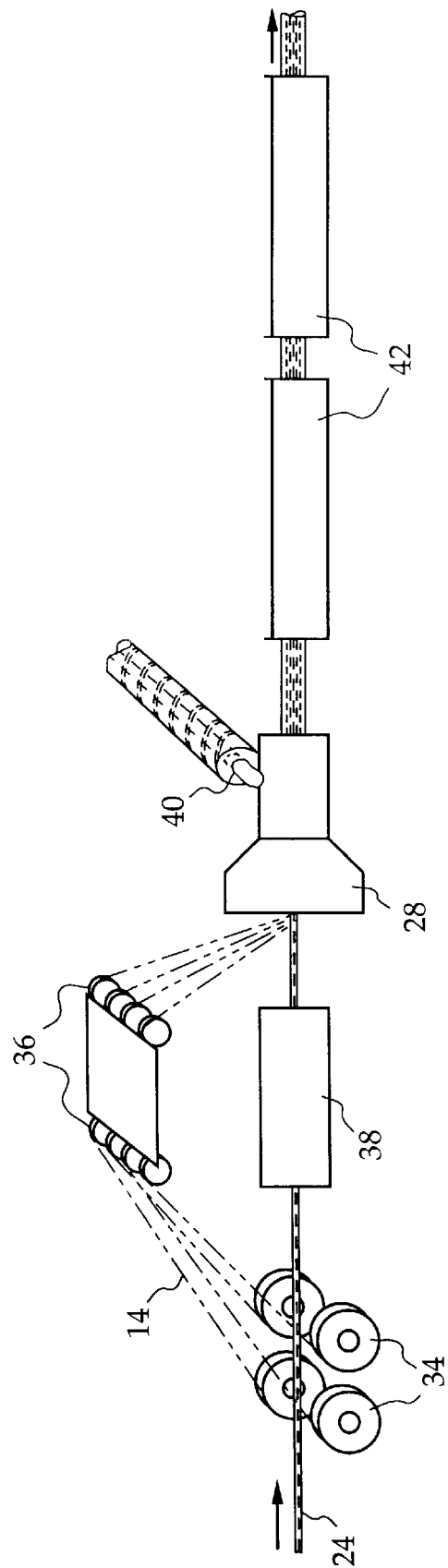

In order that the invention and its various other preferred features may be understood more easily, embodiment thereof and their method of manufacture will now be described, by way of example only, with reference to the drawings, in which:

FIG. 1 is a cross sectional view taken through an optical fibre cable of a type previously produced by us, FIG. 2 is a cross sectional view taken through an optical fibre cable constructed in accordance with this invention, FIG. 3 is a schematic illustration showing one method of manufacture of an optical fibre cable in accordance with the invention, and FIG. 4 is a schematic illustration showing an alternative method of manufacture of an optical fibre cable in accordance with the invention.

In the drawings the same reference numerals will be employed to identify similar elements.

FIG. 1 illustrates in cross section the construction of an optical fibre cable previously produced by us. This comprises a kingwire 10 around which there is extruded a first layer 12 of thermo plastics elastomer having a Youngs Modulus value approximately 100 MPa at 20° C. (MegaPascals). A plurality of optical fibres 14 are disposed substantially parallel with the kingwire and are embedded into the outer surface of the layer 12. This is carried out by melting the outer surface 16 of the layer 12 and pressing the fibres into the melted material. A second layer 18 of thermo plastic material is then extruded over the outer surface of the layer 12 and the exposed surface of the fibres 14. The fibres inserted in this way can be distorted due to pressing into the first layer, and also the fibres are subject to stress induced at the boundary between the layers, which stress occurs during cooling of the package to room temperature. This is because there is differential shrinkage between the outer and inner layers.

Referring now to FIG. 2 there is shown a revised construction in accordance with the invention where the optical fibres 14 are laid on the outer surface 16 of the first layer 12 when the temperature of the first layer is below its melting point so that no embedding of the fibres into the layer 12 occurs. A second layer 18 is then extruded over the fibres and first layer and a cooling shrinkage of the outer layer does not result in significant stress being imparted in the embedded fibres as they do not extend into the first layer. The stress reduction is enhanced by employing a thermoplastics material having a lower value of Youngs Modulus of less then 100 MPa at 20° C. such as HYTREL 35D which has a Youngs Modulus value of 46 MPa at 20° C.

Referring now to FIG. 3 there is shown one method of manufacturing the optical fibre cable shown in FIG. 2. A first extruder 20, into which there is introduced a thermoplastics material through an input 22, extrudes a thermoplastic coating 24 onto a kingwire 10. The kingwire with its extrudate layer is then passed through a cooler 26 where the coating is set by reduction of its temperature below its melt point. The kingwire with its extruded layer then is introduced into an optical fibre feeder 28 where a feed of a plurality of optical fibres 14 are laid along the outer surface 16 of the extruded layer 12. On emerging from the optical fibre feeder 28 the cable is passed through a second extruder 30 where a second layer of thermoplastic material 32 is extruded over the fibres and the first layer. The temperature of the second extrusion is controlled at a temperature which does not result in melting or significant softening of the first layer. For example in the case of the use of HYTREL 40D or 35D a temperature range of 156° C. to 200° C. is possible, 160–190° is preferred and a value of approximately 150° C. is ideal. In such an arrangement the fibres are not embedded into the first layer 12 and consequently are not subject to induced stresses at a transition due to cooling of the outer layer.

The fibres are preferably twisted along their length before applying the second layer. The twisting may be about their own axis and/or helically about the Kingwire and can be a to and fro twist through a predetermined angle. The or each twist may be one turn in between 1 and 10 meters. Such twisting has the effect of averaging out any inherent distortion and so minimises polarisation mode dispersion.

FIG. 4 shows a modification to the method in which in the second stage, following the cooling of the first layer or coating 24 onto the kingwire, the coating is heated in a preheater 38 to a temperature just below its melt point prior to introduction into a fibre gathering and extruder die 28 which receives fibres 14 fed from fibre bobbins 34 via a preheater 36. The preheater 36 does not raise the temperature of the fibres above the melt point of the coating 24. The die 28 causes the fibres to be laid along the coating 24 and a second layer of thermoplastic elastomer introduced through an input 40, is extruded over the fibres. The combination is then passed through cooling troughs 42. It should be appreciated that the method steps described in relation to FIG. 4 could be performed in a continuous process following the extrusion of the first layer over the kingwire or as a separate operation where the kingwire is coated with the first layer, stored and subsequently employed as described in connection with FIG. 4.

In any of the previously mentioned methods the first elastomer layer should be arranged to be at a temperature of up to 26° C. below the melt point when laying the optical fibres, preferably within 6° C. HYTREL 40D and 35D both have a melt point of 156° C. so that an elastomer layer temperature of between 120° C. and 156° C. should be employed, preferably within 150° C. and 156° C. and ideally at 15° C. The temperature of extrudate employed in the extrusion of the second layer should be in a range from just above the melt point to about 50° C. above the melt point. In the case of HYTREL 35D and 40D a temperature of between 160° C. and 200° C. is preferred. The temperature employed should not be so high as to cause melting of the first layer. Clearly higher temperatures can be employed if the cooling troughs are provided immediately after the die 28 so that cooling is effected in a short time such that melting of the first layer does not occur. We have found that with HYTREL 35D and 40D an extrudate temperature of 190° C. followed by immediate cooling results in an excellent surface finish for the cable.

Tests have shown that the before mentioned reduction of the Youngs Modulus of the elastomer and location of the fibres outside the transition between elastomer layers results in a considerably lower level of polarisation mode dispersion in the region of 0.04 to 0.09 ps/km$^{-1/2}$ the value of which does not change significantly as a result of environmental changes.

We claim:

1. A method of manufacturing an optical fibre cable comprising the steps of, extruding a thermoplastic elastomer layer (12) around a kingwire (10), characterised in the steps of setting the elastomer layer (12), laying a plurality of optical fibres (14) along the set elastomer layer (12) without embedding the plurality of optical fibres (14) in the set elastomer layer (12) and extruding a further layer (18) of thermoplastic elastomer over the fibres (14) for embedding the plurality of optical fibres in the further layer (18) of thermoplastic elastomer.

2. A method as claimed in claim 1, characterised in that it is carried out in one processing line where after extruding the thermoplastic elastomer layer (12) around the kingwire (10) the coated kingwire is cooled to a temperature below the melt temperature of the elastomer and then the optical fibres (14) are layed therealong.

3. A method as claimed in claim 1, characterised in that, after extruding the thermoplastic elastomer layer (12) around the kingwire (10), the coated kingwire is cooled to solidify the coating and is subsequently heated to soften the layer (12) at a temperature below the melt point of the elastomer prior to laying the optical fibres (14) there along.

4. A method as claimed in claim 3, characterised in that it is carried out in two separate production processes wherein the coated kingwire (10,12) is produced and stored and is subsequently employed in the process of laying the plurality of optical fibres (14) including the step of preheating the elastomer coating (12) to a temperature below its melt point to soften the layer prior to laying the optical fibres (14) therealong.

5. A method as claimed in claim 1, characterised in that the temperature of the first elastomer layer is arranged to be up to 26° below the melt point when laying the optical fibres.

6. A method as claimed in claim 5, characterised in that the temperature of the elastomer layer (12) is arranged to be within 6° C. of the melt point of the elastomer.

7. A method as claimed in claim 1, characterised in that the elastomer has a melt point of approximately 156° C.

8. A method as claimed in claim 1, characterised in that the thermoplastic elastomer employed has a Youngs Modulus value less than 100 MPa at 20° C.

9. A method as claimed in claim 1, characterised in that the extrusion temperature for the further layer (18) of thermoplastic elastomer is between 156° C. and 200° C.

10. A method as claimed in claim 1, characterised in that the fibres (14) are twisted about their own axes prior to extrusion of the further layer (18).

11. A method as claimed in claim 10, characterised in that the or each twist is a continuous twist.

12. A method as claimed in claim 10, characterised in that the or each twist is a to and fro twist through a predetermined angle.

13. A method as claimed in claim 10, characterised in that the or each twist is one turn in between 1 and 10 meters of fibre length.

14. A method as claimed in claim 1, characterised in that the fibres (14) are twisted helically about the first layer (12) prior to extrusion of the further layer (18).

15. A method as claimed in claim 14, characterized in that the or each twist is a continuous twist.

16. A method as claimed in claim 14, characterized in that the or each twist is a to and fro twist through a predetermined angle.

17. A method as claimed in claim 14, characterized in that the or each twist is one turn in between 1 and 10 meters of fiber length.

18. An optical fibre cable, comprising a kingwire (10) provided with inner and outer extruded layers (12, 18) of a thermoplastic elastomer, characterised in that a plurality of optical fibres (14) are disposed on but not embedded in the outer surface of the inner layer (12) and embedded in the outer layer (18).

19. An optical fibre cable as claimed in claim 18, characterised in that the thermoplastic elastomer has a Youngs Modulus value less than 100 MPa at 100° C.

20. An optical fibre cable as claimed in claim 18, characterised in that the fibres (14) are twisted about their own axis.

21. An optical fibre cable as claimed in claim 20, characterised in that the or each twist is a continuous twist.

22. An optical fibre cable as claimed in claim 20, characterised in that the or each twist is a to and fro twist through a predetermined angle.

23. An optical fibre cable as claimed in claim 20, characterised in that the or each twist is one turn in between 1 and 10 meters.

24. An optical fiber cable as claimed in claim 21, characterized in that the or each twist is one turn in between 1 and 10 meters.

25. An optical fiber cable as claimed in claim 22, characterized in that the or each twist is one turn in between 1 and 10 meters.

26. An optical fibre cable as claimed in claim 18, characterised in that the fibres (14) are twisted helically about the kingwire (10).

27. An optical fiber cable as claimed in claim 26, characterized in that the or each twist is a continuous twist.

28. An optical fiber cable as claimed in claim 26, characterized in that the or each twist is a to and fro twist through a predetermined angle.

29. An optical fiber cable as claimed in claim 26, characterized in that the or each twist is one turn in between 1 and 10 meters.

* * * * *